Aug. 14, 1951  M. F. SIGURJONSSON  2,564,377
MOTOR SLED
Filed Jan. 10, 1948  2 Sheets-Sheet 1
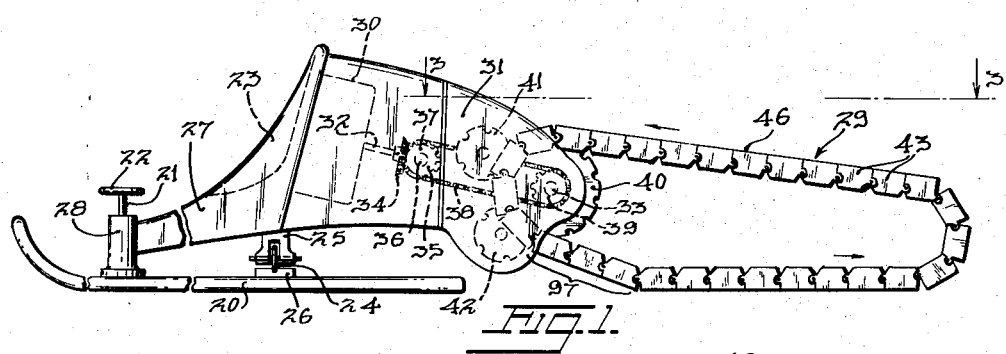
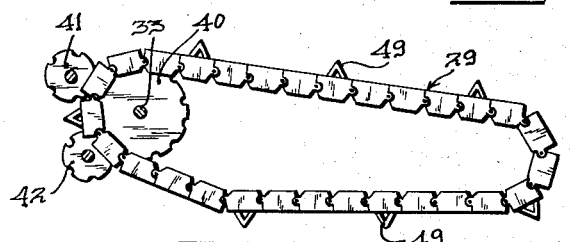
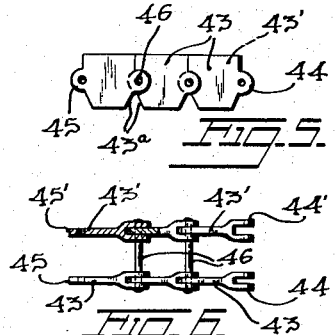
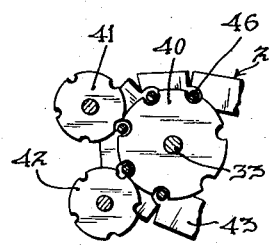
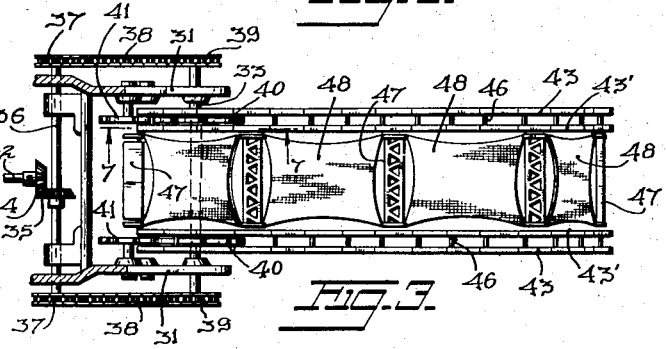
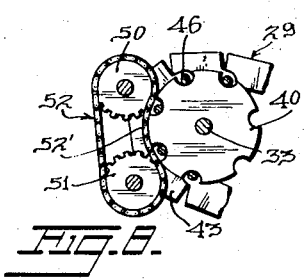
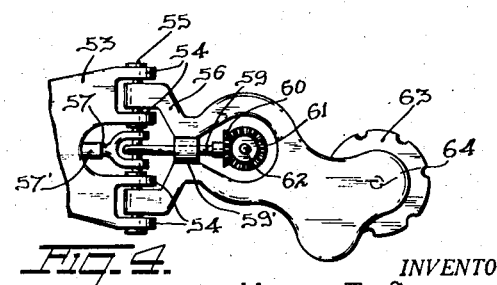
INVENTOR.
MARKUS F. SIGURJONSSON
BY
ATTORNEY

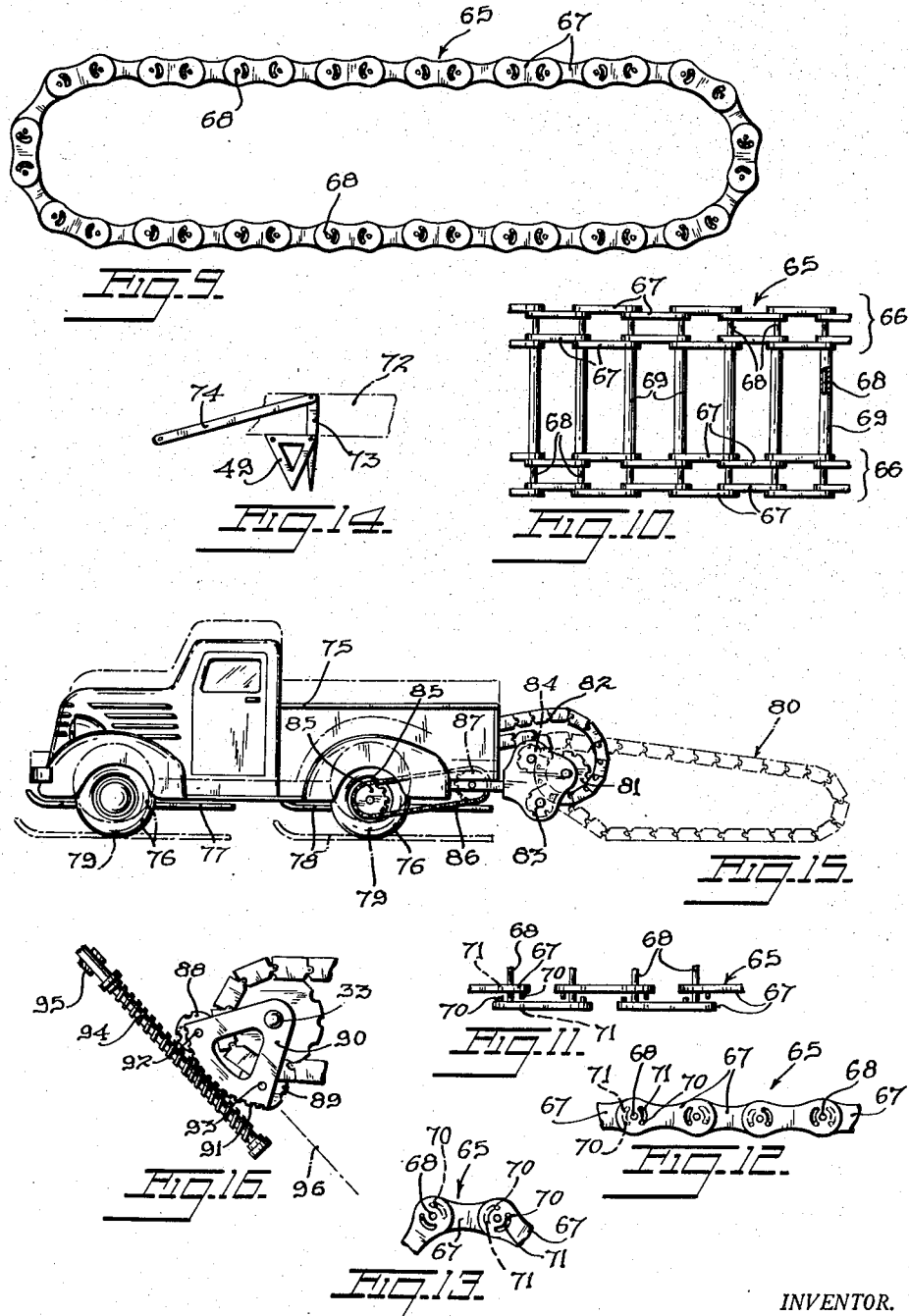
Aug. 14, 1951    M. F. SIGURJONSSON    2,564,377
MOTOR SLED
Filed Jan. 10, 1948    2 Sheets-Sheet 2
INVENTOR.
MARKUS F. SIGURJONSSON
BY
ATTORNEY Patented Aug. 14, 1951

2,564,377

UNITED STATES PATENT OFFICE 2,564,377

MOTOR SLED

Markus F. Sigurjonsson, Reykjavik, Iceland

Application January 10, 1948, Serial No. 1,549

8 Claims. (Cl. 180—5)

This invention relates to new and useful improvements in motor sleds.

More specifically, the present invention, proposing in its simplest form a sled-like vehicle incorporating (a) a forward body itself shaped to constitute a sled or arranged to have underlying runners or skis and hereinafter called the sled structure, and (b) a secondary structure swivelly connected to the sled structure, provides, in combination with said vehicle, motor-driven traction means supported from said secondary structure in such manner that the traction means and the motor do not interfere with turning of the vehicle for steering. The motor sled of the invention, in one of its many possible simpler forms, carries a driver's seat on the secondary structure, and is equipped with steering means accessible to the driver.

The principal object of the invention is to provide a traction means, in the nature of an endless chain, hereinafter called the chain, which is of broadly novel type, and which operates on a new principle. Said means, not being a belt, but a chain as just stated, and so endwisely movable by engagement with a sprocket means one or more of the sprockets of which drives the chain, is supported by the sprocket means only at its field of travel where its bottom forwardly travelling length curvilinearly changes direction for transformation into its upper rearwardly travelling length.

A feature of the invention is that the chain links, these shaped to present tread elements, are further so formed, and at the same time so interpivoted, that with the traction means in operation the chain along all its portions aft or in rear of the sprocket means are self-sustaining in their intended dispositions.

Still another feature of the invention is an arrangement whereby the sprocket connections may be readily modified at will, to vary the coaction between said connections and the chain, thereby to insure that the tractive action of the chain tread will be exactly as predetermined, as different types of snow and/or ice ground areas are to be traversed; so as always to have the chain tread obtain a solid grip on the surface to be travelled over and at the same time always to have proper and solid grip between the sprocket means and the chain, while attaining the fundamental object of the invention.

A further object is to have the entirety of the chain tread literally hang from the sprocket means, by engagement with said means of the front part of the chain tread only. Thereby, the remainder of the chain tread unengaged with any guiding, holding or driving means, hangs freely toward the ground; that is, the lower part of the chain tread hugs the ground with the other parts of the chain tread keeping their proper positions by the structure of the chain itself. It is to be emphasized that the chain tread is intended only to effect forward propulsion of the vehicle to which it is attached, and not to support the weight of the vehicle; although, in carrying out the invention, the right is reserved to use the chain for the latter purpose also.

While a plurality of versions or modifications of the chain tread are shown herein, this is merely by way of example, and not to be taken as in any way a limitation. The same comment applies to the nature of the vehicle which carries the seat, the steering means and the motor; and such vehicle may be provided for carrying any number of passengers, or for transporting a large weight of supplies or other freight, or both. The same comment further applies to the manner of steering the vehicle; and likewise to such details as the driving connections from the motor to the chain, the nature of the structure on which the sprocket means are mounted, the nature of the structure upon which the driver's seat is carried, etc., etc.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a side elevation of a motor sled pursuant to the invention.

Fig. 2 is a side elevation showing the chain tread of Fig. 1, per se, but with digger elements added.

Fig. 3 is a view showing in top plan of the traction tread looking in the direction of the line 3—3 of Fig. 1.

Fig. 4 shows in side elevation an auxiliary structure for interposition, if desired, between the vehicle and the sprocket means at the forward end of the chain; said auxiliary structure when thus interposed providing a modified version of the motor sled of Fig. 1.

Fig. 5 is an enlarged side elevation of a group of adjoining links of the chain tread of Figs. 1–3.

Fig. 6 is a top plan view of Fig. 5.

Fig. 7 is a detail view, being a slightly enlarged section taken on the line 7—7 of Fig. 3.

Fig. 8 is a view similar to Fig. 7, but illustrating a modified sprocket connection.

Fig. 9 is a side elevation of a modified form of chain tread.

Fig. 10 is a top plan view of a portion of Fig. 9.

Fig. 11 is a detail view in top plan, showing adjoining links of a line of links of the chain tread of Figs. 9 and 10 in course of being moved toward each other for interconnection.

Fig. 12 is an enlarged side elevational view of the links of Fig. 11 after being interconnected.

Fig. 13 shows the links of Fig. 12 as they would conform themselves to a sprocket of such diameter as to arrange the line of links passing thereover to give said line of links a curvilinear extension longitudinally of the chain of the maximum possible radius.

Fig. 14 is a detail view for showing more clearly the digger elements carried by the chain tread of Fig. 2, and also for showing supplementary digger elements.

Fig. 15 shows in side elevation a different form of vehicle than that illustrated in Fig. 1, having road wheels as well as runners or skis, for use of either at will; this view showing in dot and dash lines a chain tread according to the invention, in use, and showing in full lines said chain tread stowed, when not in use.

Fig. 16 is a detail view, illustrating a means adjustable to render the chain tread, as used in combination with the vehicle of Fig. 1 or any other suitable type of vehicle, either inoperative or for modifying the angle of departure from the ground of the forwardly upwardly inclined length of the chain tread ahead of its said bottom length, thus to modify the tractive action of the chain tread.

Referring to the drawings more in detail, and first to Figs. 1–3 and 5–8, the motor sled, as illustrated in its simplest form, comprises a forward vehicle 20 itself constituting a sled and carrying a rigid vertical shaft 21 on the top of which is secured a steering wheel 22. A seat 23 is movably supported near the rear of the sled 20 by means of a wheel 24 held in a clevis 25 secured to the bottom of the seat and rolling in an arcuate track 26 secured to the sled. The seat has a body 27 provided with a boss 28 through which the shaft 21 extends. Thus, a person on the seat 23 can turn the wheel 22 and thereby turn the sled for steering. The sled may be any appropriate type of sled, and the seat is representative merely of a carrier; and any other suitable carrier can be used, such as a small cab, a truck body or the like.

Rearwardly extending from the sled 20 there is an endless chain tread 29 driven by a motor 30 supported at the back of the seat 23 between a pair of side plates or frames 31; the shaft 32 of the motor being connected to the main driving axle 33 by a drive mechanism including a pair of bevel gears 34 and 35, a cross-shaft 36 carrying the gear 35, a pair of sprockets 37 on the shaft 36, chains 38 for the latter which also engage sprockets 39 on the driving axle 33, and a pair of chain-tread-driving sprockets 40 on the driving axle 33. Idler sprockets 41 and 42 are rotatably carried by the side frames 31, one pair of these sprockets 41 and 42 adjacent each side frame.

The chain tread 29 includes two endless chains, one at each side of the tread, and each chain to be driven by one of the sprockets 40 while the forward portion of that chain is held against the sprockets by the adjacent pair of idler sprockets 41 and 42.

Each chain of the chain tread according to the version or embodiment of Figs. 1, 2, 5 and 6 consists of links formed as plates 43 and 43', these arranged in side by side pairs, and each plate having a central, reduced forked end 44 or 44' for receiving the central, reduced unforked end 45 or 45' of an immediately adjoining link. Cross-studs 46 pivotally connect each set of four plates 43, 43', 44 and 44', these studs having enlarged central lengths for properly spacing each plate 43 from its opposite plate 43'.

Also provided, as spacers between the two chains, are girders 47, these connecting every fifth plate 43 of one chain with the corresponding plate 43' of the other chain. Between the girders are stretched nets 48 which, working in the same way as snow-shoes, prevent the chain tread 29 from sinking too deep into soft snow.

Each link-plate 43, which is exactly like each link-plate 43', has, above its fork 44, a straight vertical edge for being flatly abutted by a straight vertical edge above the unforked projection 45 of the next adjoining link-plate 43, thereby to hold the main upper length of each chain stiffly in a substantially straight-line extension as shown in Fig. 1, and also to hold the main lower length of each chain stiffly in a substantially straight-line extension against upward movement intermediate of its ends, as shown in Fig. 1, and also to hold, ahead of the main length just-mentioned, another shorter length of the chain stiffly to straight-line extension as shown in Fig. 1; these shorter lengths of the two chains upwardly rising to the point where the chains begin to assume a curvilinear direction of extension due to engagement of their cross-studs 46 with the spaces between the teeth of the sprockets 40.

In order, however, to allow each chain naturally and by its own weight always to have at the trailing end of the tread an end portion which curvilinearly extends as shown at the right in Fig. 1, and also to allow each chain at the forward end of the tread to travel around its sprocket 40, each link-plate 43 as viewed in Fig. 5 has the bottom portions of its forward and rear straight edges downwardly converged toward each other, thus to establish the lower portion of each link-plate as the frustum of an inverted triangle. Consequently, each link-plate may be rotated relative to an immediately adjoining one through an angle measured by the slants of said forward and rear edges, these last marked 43ᵃ in Fig. 5.

Hence there is no need to provide sprocket means or any other engaging, holding or guiding means at the trailing end of the chain tread, as the various straight lengths of such tread, such as those seen, for instance, in Fig. 1, are all self-sustaining; yet the endless tread is freely flexible so far as is concerned permitting any link-plate to swing in the required direction to permit drive of the tread merely from the sprockets 40 and to permit such drive to be continuous because of a continuously renewed curvature at the trailing end of each chain for continually transferring the rearwardly travelling rear portion of its main bottom length to a position to constitute a rear but forwardly travelling portion of its main upper length.

Referring to Fig. 2, the chain tread here shown is the same as in Fig. 1, except that each girder 47 has rigidly offset therefrom a triangular digger element 49, for biting into underlying snow and ice; these elements 49 desirably extending all the way across that part of the width of the chain tread measured by the length of a girder 47.

In Fig. 8 a modification is shown in which, in lieu of each of the two sets of idler sprockets 41 and 42, there is substituted a device comprising a pair of small-toothed sprockets 50 and 51, placed in line with the driving sprocket 40 at each side of the motor sled and engaged by an endless chain of such length that an arcuate stretch 52' thereof is provided for lying over a plurality of the cross-studs 46 as the latter nest in the interteeth spaces of the adjacent sprocket 40.

The sprockets 50 and 51 are fixed on shafts corresponding to the shafts on which the idler sprockets 40 and 41 are fixed; and a pair of sprockets 50 and 51 together with their chain 52 may be provided as just explained for alignment with each of the pair of sprockets 40 at each of the two sides of the motor sled, or merely a single set of the sprockets 50 and 51 and the chain 52 may be used when so mounted on the shafts last-mentioned that the arcuate portion 52' of the chain 52 is at or near a point midway of the width of the chain tread for engaging the cross-studs 46 at or near points midway along their lengths.

Referring to Fig. 4, the auxiliary structure here shown may be interposed between and suitably attached to the side frames 31, thereby to provide, in combination with the arrangement of Fig. 1, another version or form of the invention, and an embodiment of the invention wherein the chain tread may swing about a vertical axis relative to the motor support.

This auxiliary structure includes a mounting member 53 incorporating a vertical plate for its rear portion as illustrated, at the top and bottom of which rear portion are forks 54. By means of these forks and pivot pins 55, a yoke 56 is mounted to swing about a vertical axis. The motor shaft, here indicated at 57, passes through a bearing 57' and in rear of the latter is connected by a universal joint 58 to a shaft 59 journalled in a boss 59'.

On the shaft 59 there is fixed a bevel gear 60 corresponding to the gear 34, meshing with a bevel gear 61 corresponding to the gear 35. Said gear 61 is fixed on a shaft 62 corresponding to the shaft on which the gear 35 is secured; while sprockets corresponding to the sprockets 40 are indicated at 63, and their driving axle at 64. Although not shown, parts corresponding to the sprockets 37 and 39 and the chains 38 will also be present, for drive to the axle 64 and to the sprockets 63 as will also be present idler sprockets corresponding to the sprockets 41 and 42.

Referring to the version or embodiment of the endless chain of the invention as illustrated in Figs. 9-13, such version is marked generally 65. Here the endless chain at each side of said tread also is shown as consisting of two lines 66 of links 67.

All the links 67 are similar, being flat plates of substantially dumbbell outline, and they are arranged in side by side pairs, with each set of two pairs pivotally connected by a cross-rod 68. The two chains are spaced laterally of the chain tread by sleeves 69 on the cross-rods 68. This type of chain tread, which also may be equipped at suitable intervals with suitably mounted digger elements corresponding to the elements 49, operates according to the basic principle of the invention exactly as described in connection with the version of chain tread including the link-plates 43, 43', 44 and 44', by reason of the provision of means corresponding in function to the shapings of the upper and lower portions of the forward and rear edges of the main portions of said link-plates.

The means here employed for the purpose, however, are located wholly within the confines of the links 67. Each link 67 near one end thereof has an offset pin 70, and near its opposite end an arcuate slot 71. All the links are exactly alike, except that the inner links of each line of links of each chain have their pins 70 outwardly extended and the outer links of each line of links of each chain have their said pins inwardly extended. The slots 71 are so located that when the links of a line of links of a chain are placed oppositely each other as in Fig. 11, the chain may be assembled by moving the links facewisely toward each other to enter the pin 70 of each link of a line of links into the slot 71 of the immediately overlapped link of that line of links.

As will be noted from a comparison of Figs. 9 and 13, the curvilinearly extending end lengths of the chain tread are permitted to become thus arranged, due to the way in which the pins of the links of such lengths lie in their slots 71, whereas the straight lengths of the chain tread extending between said end lengths thereof are stiffly self-sustaining in one direction, due to the way in which the pins of the links of these straight lengths lie in their slots 71.

Referring to Fig. 14, with here the bottom straight length of a chain tread of the invention in any of its forms schematically indicated at 72, one of the digger elements 49 is shown, as is also shown a supplementary digger element 73, braced by a bar 74; which supplementary digger element may be used with each of several or all of the digger elements 49, and may be in the nature of a shovel or chisel-like blade extending across the width of the chain tread or in the nature of spikes or picks at opposite sides of the chain tread.

Referring to Fig. 15, here the vehicle is shown as a truck 75 having a running gear including road wheels 76 and also including skis or runners 77 and 78. As the parts are illustrated in full lines, the vehicle is arranged for travel on said wheels; but a suitable means, as a hydraulically operated one, is associated with the mountings for the skis, so that, at will, the skis may be lowered sufficiently to raise the bottoms of the wheels for travel on the skis. Such mountings are indicated at 79, where they appear in connection with the showing in dot and dash lines of the lowered skis and the consequently raised truck body.

With the skis thus lowered, the motor sled including the truck 75 may be propelled over ice by a chain tread pursuant to the invention, for instance by a chain tread 80 of the type described in connection with Figs. 1, 3 and 4, and a chain tread driven, for instance, by means similar to the means described in connection with the views last-mentioned.

Said means is here shown as including driving sprockets 81 and idler sprockets 82 and 83, corresponding respectively to the sprockets 40, 41 and 42, a support 84 for mounting said sprockets and corresponding to the yoke 56 and suitably carried at the rear of the truck. Through a driving connection to a shaft on which are secured the driving sprockets 81, such connection not shown but one which may be as described in connection with Fig. 4, the motor of the truck may be used for operating the chain tread, by means of a sprocket 85 fixed to and rotating with one of the truck wheels 76 and a chain 86 engaging that sprocket and also engaging a sprocket 87 leading to said driving connection.

When, by means of a suitable clutch not shown, power drive to the chain 86 is cut off, and when thereafter the skis 77 and 78 are elevated to support the truck on its wheels 76, the chain tread 80, without disconnection from its sprockets on the support 84, may be swung back on itself for stowage in the rear of the truck body as indicated in solid lines in Fig. 15.

Referring to Fig. 16, here the driving sprockets 40 and the chain tread 29 of Figs. 1 and 3 are again shown, as are also idler sprockets 88 and 89 corresponding to the idler sprockets 41 and 42. Said sprockets 88 and 89, however, are illustrated as journalled on a rocker-frame including a pair of end plates one of which is indicated at 90; both said plates being loosely pivoted on the driving axle 33, both being alike except that only one of them need be provided with the worm-teeth shown at 91, and both being coupled into one rigid structure by the shafts 92 and 93 on which the sprockets 88 and 89 are mounted.

Meshing with said worm-teeth is a worm 94, suitably journalled as at 95, for being turned, as by means of a handle not shown.

When the worm 94 is turned, the sprockets 88 and 89 are bodily moved through an arcuate path, in one direction or another, thus to change as desired their centers of rotation relative to the center of rotation of the driving sprockets 40, and consequently to predetermine as desired the oblique angle of downward rearward extension of the forward shorter bottom length of the chain tread; for instance, to arrange that the latter shall descend in the direction of the dot and dash line 96 in Fig. 16, or as shown at 97 in Fig. 1, or at any other selected angle, or to cause the bottom length of the chain tread as a whole to extend horizontally from the bottoms of the driving sprockets 40. The arrangement of the chain tread last referred to is like that shown in full lines in Fig. 16, and also in Fig. 9, as for coasting down hill, or, in the case of a motor sled including the truck 75 or some other form of vehicle having road wheels, while travelling on such wheels.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. Drive mechanism for use on a vehicle or the like, comprising a main drive shaft mounted across the back of the vehicle, a motor on the vehicle for continuously rotating said main drive shaft, spaced sprockets mounted on said drive shaft to rotate therewith, laterally spaced endless chains extended over said sprockets and extended rearward therefrom, said chains being formed of a plurality of links pivotally connected together between their inner and outer edges, and idler sprockets rotatively mounted to engage said chains where they pass over said first-mentioned sprockets, adjacent edges of said links outward of their pivots being parallel and abutted against one another and inward of their pivots being diverged away from each other, whereby to preclude collapse of the upper runs of said chains leaving the lower runs free to flex to the contour of the surface over which said chains are passing.

2. Drive mechanism for use on a vehicle or the like, comprising a main drive shaft mounted across the back of the vehicle, a motor on the vehicle for continuously rotating said main drive shaft, spaced sprockets mounted on said drive shaft to rotate therewith, and laterally spaced endless chains extended over said sprockets and extended rearward therefrom, said chains being formed of a plurality of links pivotally connected together between their inner and outer edges, adjacent edges of said links outward of their pivots being parallel and abutted against one another and inward of their pivots being diverged away from each other, so constructed and arranged as to preclude collapse of the upper runs of said chains leaving the lower runs free to flex to the contour of the surface over which said chains are passing, and means retaining each of said chains curved about its respective sprocket.

3. Drive mechanism for use on a vehicle or the like, comprising a main drive shaft mounted across the back of the vehicle, a motor on the vehicle for continuously rotating said main drive shaft, spaced sprockets mounted on said drive shaft to rotate therewith, and laterally spaced endless chain extended over said sprockets and extended rearward therefrom, said chains being formed of a plurality of links pivotally connected together between their inner and outer edges, adjacent edges of said links outward of their pivots being parallel and abutted against one another and inward of their pivots being diverged away from each other, so constructed and arranged as to preclude collapse of the upper runs of said chains leaving the lower runs free to flex to the contour of the surface over which said chains are passing, and mean retaining each of said chains curved about its respective sprocket, said retaining means comprising a pair of idler sprockets for each of said sprockets, said idler sprockets being rotatively mounted on the vehicle and engaging said chains where they pass over said first-mentioned sprockets.

4. Drive mechanism for use on a vehicle or the like, comprising a main drive shaft mounted across the back of the vehicle, a motor on the vehicle for continuously rotating said main drive shaft, spaced sprockets mounted on said drive shaft to rotate therewith, laterally spaced endless chains extended over said sprockets and extended rearward therefrom, said chains being formed of a plurality of links pivotally connected together between their inner and outer edges, idler sprockets rotatively mounted to engage said chains where they pass over said first-mentioned sprockets, adjacent edges of said links outward of their pivots being parallel and abutted against one another and inward of their pivots being diverged away from each other, whereby to preclude collapse of the upper runs of said chains leaving the lower runs free to flex to the contour of the surface over which said chains are passing, and means interconnecting said chains for maintaining them parallelly spaced.

5. Drive mechanism for use on a vehicle or the like, comprising a main drive shaft mounted across the back of the vehicle, a motor on the vehicle for continuously rotating said main drive shaft, spaced sprockets mounted on said drive shaft to rotate therewith, laterally spaced endless chains extended over said sprockets and extended rearward therefrom, said chains being formed of a plurality of links pivotally connected together between their inner and outer edges, idler sprockets rotatively mounted to engage said chains where they pass over said first-mentioned sprockets, adjacent edges of said links outward of their pivots being parallel and abutted against one another and inward of their pivots being diverged away from each other, whereby to preclude collapse of the upper runs of said chains leaving the lower runs free to flex to the contour of the surface over which said chains are passing, and spaced girders mounted between laterally aligned links of said chains for maintaining the chains parallelly spaced.

6. Drive mechanism for use on a vehicle or the like, comprising a main drive shaft mounted across the back of the vehicle, a motor on the vehicle for continuously rotating said main drive shaft, spaced sprockets mounted on said drive shaft to rotate therewith, laterally spaced endless chains extended over said sprockets and extended rearward therefrom, said chains being formed of a plurality of links pivotally connected together between their inner and outer edges, idler sprockets rotatively mounted to engage said chains where they pass over said first-mentioned sprockets, adjacent edges of said links outward of their pivots being parallel and abutted against one another and inward of their pivots being diverged away from each other, whereby to preclude collapse of the upper runs of said chains leaving the lower runs free to flex to the contour of the surface over which said chains are passing, spaced girders mounted between laterally aligned links of said chains for maintaining the chains parallelly spaced, and means extended between said girders for supporting the chains against sinking into a soft surface.

7. Drive mechanism for use on a vehicle or the like, comprising a main drive shaft mounted across the back of the vehicle, a motor on the vehicle for continuously rotating said main drive shaft, spaced sprockets mounted on said drive shaft to rotate therewith, laterally spaced endless chains extended over said sprockets and extended rearward therefrom, said chains being formed of a plurality of links pivotally connected together between their inner and outer edges, idler sprockets rotatively mounted to engage said chains where they pass over said first-mentioned sprockets, adjacent edges of said links outward of their pivots being parallel and abutted against one another and inward of their pivots being diverged away from each other, whereby to preclude collapse of the upper runs of said chains leaving the lower runs free to flex to the contour of the surface over which said chains are passing, spaced girders mounted between laterally aligned links of said chains for maintaining the chains parallelly spaced, and nets of cloth material extended between said girders to serve after the manner of snow shoes for supporting the chains against sinking into the soft snow.

8. Drive mechanism for use on a vehicle or the like, comprising a main drive shaft mounted across the back of the vehicle, a motor on the vehicle for continuously rotating said main drive shaft, spaced sprockets mounted on said drive shaft to rotate therewith, laterally spaced endless chains extended over said sprockets and extended rearward therefrom, said chains being formed of a plurality of links pivotally connected together between their inner and outer edges, idler sprockets rotatively mounted to engage said chains where they pass over said first-mentioned sprockets, adjacent edges of said links outward of their pivots being parallel and abutted against one another and inward of their pivots being diverged away from each other, whereby to preclude collapse of the upper runs of said chains leaving the lower runs free to flex to the contour of the surface over which said chains are passing, spaced girders mounted between laterally aligned links of said chains for maintaining the chains parallelly spaced, and digger elements mounted on said girders and being of a length to project beyond the outer peripheries of said chains.

MARKUS F. SIGURJONSSON.

REFERENCES CITED

The following references are of record in the file of this patent:

UNITED STATES PATENTS

| Number | Name | Date |
|---|---|---|
| 817,071 | King et al. | Apr. 3, 1906 |
| 2,074,389 | Grant | Mar. 23, 1937 |